Patented Mar. 8, 1932

1,848,723

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

METHOD OF REGENERATING CATALYSTS

No Drawing. Original application filed August 3, 1925, Serial No. 48,002, now Patent No. 1,678,627. Divided and this application filed November 5, 1927. Serial No. 231,392.

This invention relates to the regeneration or revivification of catalysts or catalytic contact masses which have partly or completely lost their catalytic activity or efficiency; and relates more particularly to a method of restoring more or less completely the catalytic activity of contact masses which are employed in the catalytic oxidation of organic substances.

It is well known that the contact masses employed in the catalytic oxidation of organic substances often lose upon use over a period of time more or less of their catalytic power and efficiency.

This may be illustrated, for example, in the known deterioration or depreciation of the catalytic activity which often occurs in contact masses employed in the catalytic oxidation of napthalene to alphanaphthoquinone, phthalic anhydride or maleic acid, of benzene, toluene and phenol to maleic acid, of benzene and phenol to benzoquinone, of toluene and its substitution products and derivatives to the corresponding aldehydes and acids, of anthracene to anthraquinone, of acenaphthene to acenaphthaquinone, napthalic anhydride, etc. of phenanthraquinone, etc., of methyl alcohol to formaldehyde, of methyl alcohol to acetic acid; and the like.

The depreciation or loss in the catalytic activity of a contact mass by use in the catalytic oxidation of an organic compound may be due in part to the presence in the organic substance of certain impurities which are prejudicial to the life of the catalyst. It may be due also in part to the distribution or deposition of carbon or carbonaceous material, such as, for example, difficultly combustible resins, upon the surface and interior of the contact mass thereby partially or completely coating it and diminishing its porosity and capillarity; or it may be due in part to the contact mass itself undergoing chemical alterations such as, for example, the formation of certain oxidation stages or steps such as lower oxidation products of the actual catalyst which are no longer regenerated by the oxygen of the air and consequently a sufficient amount of active oxygen is no longer available for the desired catalysis. Such changes are known to occur particularly in catalysts comprising the oxides, compounds or combinations of the elements of the fifth, sixth and seventh groups of the periodic system; but such changes are not limited to compounds containing elements of these groups. Further, the presence of stabilizers in the contact mass (that is, substances or compounds whose presence stabilizes the catalytic activity of the actual catalyst, such as, for example salts of the alkali and alkaline earth metals) may suffer chemical changes because of the reducing and other actions of the gaseous organic compounds which are being subjected to catalytic oxidation, and there by their stabilizing influence be partly or completely eliminated.

Attempts have been heretofore made to regenerate or rejuvenate the catalytic activity of depreciated catalysts which are employed in the catalytic oxidation of organic compounds by heating them to high temperatures either alone or in a current of air or oxygen, but such attempts have met with only moderate success and the desired end has not been attained.

This invention is directed to the regeneration of catalysts used in the catalytic oxidation of organic compounds which have become deteriorated by such use by treating them with non-metallic compounds containing halogens, such as non-metal halogens containing acid radicals or groups capable of existing as such in the free state or radicals which with oxygen are capable of giving non-metallic acid radicals or groups existing in the free state. The catalyst may be treated with oxygen containing gases at elevated temperatures (about 200°–500° C.). The halogen containing non-metallic acid radicals or compounds used must be volatile below red heat (about 550° C.) and for the purpose of this invention volatile compounds which decompose and leave a residue which is not volatile upon treatment with oxygen at elevated temperatures are excluded from the scope of the invention.

Among the halogen compounds which may be employed are, for example, the halogens, hydrogen halides, ammonium halides, sulfur chloride, thionyl chloride, sulfuryl chloride, phosgene, halogen substituted organic compounds such as chlorinated aromatic hydrocarbons, acyl halides, ethylene chloride or bromide; and the like.

In carrying out the process, the regenerating agents above mentioned may be passed over and through the catalyst without removing it from the catalytic chamber or, if desired, the catalyst may be removed and then subjected to treatment in any suitable manner. The treatment is continued for periods of time which may vary with different catalyzers and with the degree of increased activity which is desired or which is feasible; and the period of treatment can be readily determined by following the process of the reaction and testing the catalyst for increased activity in any suitable manner, such as, for example, utilizing the catalyzer for carrying out the catalytic oxidations of the organic substance for which it is intended. The process can be carried out under pressure less than, equal to, or greater than atmospheric pressures.

The catalytic activity of regenerated catalysts obtainable by the present invention exceeds in efficiency that which can be obtained by processes as heretofore employed. By the action of said regenerative agents on the deteriorated catalyst, the carbon and carbonaceous material is rapidly removed either by combustion or decomposition. Moreover, the reactivating reagents form in many cases more or less easily decomposable compounds with the catalyst proper which upon decomposition loosen the surface of the catalyst and permit it to be rapidly regenerated so that highly active contact masses are thereby obtained.

The following specific examples will further illustrate the invention but it will be understood that the invention is not limited thereto.

Example 1

A deteriorated contact mass originally comprising 200 liters of pumice of about the size of peas, 29 kg. by weight of iron vanadate and 3 kg. by weight of iron molybdate, and which has been deteriorated in the catalytic oxidation of acenaphthene for the production of naphthalic anhydride, is saturated at ordinary temperatures with chlorine after which it is treated with a current of air at a temperature of about 200° to 500° C. with or without the addition of steam. Or instead of treating the catalyst first with chlorine at ordinary temperatures and then with air at elevated temperatures it may be treated directly with a mixture of chlorine and air, or ethylene dichloride and air, at a temperature of about 300° to 500° C.

Example 2

A contact mass comprising 220 liters of pumice the size of peas, 20 kgs. of nickel molybdate and 25 kgs. of calcium chloride, and which has been employed in the catalytic oxidation of methyl alcohol to formaldehyde, is treated with a current of air containing nitrosyl chloride at ordinary temperatures for a period of about 2 to 5 hours and then with a current of air alone in order to purge the contact mass and apparatus of nitrosyl chloride. In case the contact mass is contaminated with carbon or carbonaceous matter, the regeneration should be carried out at temperatures of about 300° to 500° C. instead of at room temperature. In this example, phosgene can also be used in place of nitrosyl chloride but the temperature should then be about 200° C. followed by air alone at 400°–500° C.

Example 3

A contact mass prepared by treating 200 liters of ferrosilicon in pieces about the size of a pea with a saturated aqueous solution containing 12 kilograms ammonium vanadate evaporating to dryness while stirring, drying the residue, and finally heating it to about 400–450° C., and which has become deteriorated by use, in the catalytic oxidation of naphthalene for the production of phthalic anhydride, is subjected to the action of phosgene at a temperature of about 200° C. and then with air at about 400°–500° C.

It is thus seen that according to the present invention the regeneration of contact masses used in the catalytic oxidation of organic compounds can be readily and efficiently effected; and according to the composition of the catalyst a selection of a regenerating agent can be made among the acid anhydrides and their compounds of the character mentioned for appropriate use. It will also be noted that the regeneration of the catalyst can be effected in the catalytic chamber or furnace without removal of the catalyst therefrom and in many cases wthout even cooling the catalyst or furnace.

In the claims the expression "non-metallic halogen substaonce" or "non-metallic chlorine substance" defines and is intended to include both free halogen or chlorine or non-metallic compounds containing them.

This application is a division of my prior co-pending application, Serial No. 48,002, filed Aug. 3, 1925, patented July 24, 1928, No. 1,678,627.

What is claimed as new is:

1. A process of regenerating vapor phase contact masses containing compounds of metal elements of the fifth, sixth and seventh groups of the periodic system and which have become deteriorated by use in the catalytic oxidation of organic compounds, which comprises treating said contact masses at an elevated temperature with a non-metallic halogen substance which is volatile below red heat and does not leave a residue non-volatile upon treatment with oxygen containing gases at elevated temperatures.

2. A process of regenerating vapor phase contact masses containing compounds of metal elements of the fifth, sixth and seventh groups of the periodic system and which have become deteriorated by use in the catalytic oxidation of organic compounds, which comprises subjecting such contact masses to a treatment, at temperatures from 200° to 550° C. with a non-metallic halogen substance which is volatile below red heat and which does not leave a residue non-volatile upon treatment with oxygen containing gases at an elevated temperature.

3. A process of regenerating vapor phase contact masses containing compounds of metal elements of the fifth, sixth and seventh groups of the periodic system and which have become deteriorated by use in the catalytic oxidation of organic compounds, which comprises subjecting the said contact masses to treatment with a non-metallic halogen substance at an elevated temperature and then subsequently treating the contact mass with an oxygen containing gas at about 200°–500° C.

4. A process of regenerating vapor phase contact masses containing compounds of metal elements of the fifth, sixth and seventh groups of the periodic system and which have become deteriorated by use in the catalytic oxidation of organic compounds, which comprises treating said contact masses with a non-metallic chlorine substance which is volatile below red heat and which does not leave a residue non-volatile upon treatment with oxygen containing gases at elevated temperatures.

5. A process of regenerating vapor phase contact masses containing compounds of metal elements of the fifth, sixth and seventh groups of the periodic system and which have become deteriorated by use in the catalytic oxidation of organic compounds, which comprises subjecting such contact masses to a treatment with an oxygen containing gas in the presence of a non-metallic chlorine substance which is volatile below red heat and which does not leave a residue non-volatile upon treatment with oxygen containing gases at elevated temperatures.

6. A process of regenerating vapor phase contact masses containing compounds of metal elements of the fifth, sixth and seventh groups of the periodic system and which have become deteriorated by use in the catalytic oxidation of organic compounds, which comprises treating said contact masses at an elevated temperature with a non-metallic chlorine substance which is volatile below red heat and does not leave a residue non-volatile upon treatment with oxygen containing gases at elevated temperatures.

7. A process of regenerating vapor phase contact masses containing compounds of metal elements of the fifth, sixth and seventh groups of the periodic system and which have become deteriorated by use in the catalytic oxidation of organic compounds, which comprises subjecting such contact masses to a treatment, at temperatures from 200° to 550° C., with a non-metallic chlorine substance which is volatile below red heat and which does not leave a residue non-volatile upon treatment with oxygen containing gases at an elevated temperature.

8. A process of regenerating vapor phase contact masses containing compounds of metal elements of the fifth, sixth and seventh groups of the periodic system and which have become deteriorated by use in the catalytic oxidation of organic compounds, which comprises subjecting the said contact masses to treatment with a non-metallic chlorine substance at an elevated temperature and then subsequently treating the contact mass with an oxygen containing gas at about 200°–500° C.

9. A process of regenerating vapor phase contact masses containing compounds of metal elements of the fifth, sixth and seventh groups of the periodic system and which have become deteriorated by use in the catalytic oxidation of organic compounds, which comprises subjecting said contact masses to the action of elementary halogen at elevated temperatures.

10. A process of regenerating vapor phase contact masses containing compounds of metal elements of the fifth, sixth and seventh groups of the periodic system and which have become deteriorated by use in the catalytic oxidation of organic compounds, which comprises subjecting said contact masses to the action of elementary chlorine at elevated temperatures.

11. A process according to claim 3, in which the contact mass contains at least one metal element of the 5th or 6th groups of the periodic system.

12. A process according to claim 3, in which the contact mass contains vanadium.

13. A process according to claim 3, in which the contact mass contains a non-catalytic compound of an alkali forming metal.

14. A process according to claim 3, in which the treatment takes place without removal of the contact mass from the catalytic chamber in which the deterioration took plate.

Signed at Pittsburgh, Pa., this 3rd day of November, 1927.

ALPHONS O. JAEGER.